(12) United States Patent
Woodhead et al.

(10) Patent No.: US 7,957,103 B2  
(45) Date of Patent: Jun. 7, 2011

(54) FIXING OF COMPONENTS

(75) Inventors: Niki Samuel Woodhead, Bristol (GB); Andrew Robert Slayne, Bristol (GB)

(73) Assignee: Saint-Gobain Performance Plastics Rencol Limited, Bristol (GB)

( * ) Notice: Subject to any disclaimer, the term of this patent is extended or adjusted under 35 U.S.C. 154(b) by 874 days.

(21) Appl. No.: 11/718,172

(22) PCT Filed: Oct. 21, 2005

(86) PCT No.: PCT/GB2005/004067  
§ 371 (c)(1),  
(2), (4) Date: May 31, 2007

(87) PCT Pub. No.: WO2006/056731  
PCT Pub. Date: Jun. 1, 2006

(65) Prior Publication Data  
US 2007/0291417 A1 Dec. 20, 2007

(30) Foreign Application Priority Data  
Nov. 24, 2004 (GB) .................................. 0425856.2

(51) Int. Cl.  
*G11B 5/48* (2006.01)  
*G11B 21/16* (2006.01)

(52) U.S. Cl. .................................................. 360/265.2

(58) Field of Classification Search ............... 360/265.2, 360/265, 265.6, 264.1, 264, 260, 240  
See application file for complete search history.

(56) References Cited

U.S. PATENT DOCUMENTS

| | | | |
|---|---|---|---|
| 6,018,441 A * | 1/2000 | Wu et al. ..................... | 360/265.6 |
| 6,288,878 B1 | 9/2001 | Misso et al. | |
| 6,754,046 B2 * | 6/2004 | Barina et al. ............... | 360/265.6 |
| 7,367,107 B1 * | 5/2008 | Fruge et al. ................ | 29/603.04 |
| 2002/0024770 A1 | 2/2002 | Hong et al. | |
| 2004/0246627 A1 * | 12/2004 | Durrum et al. ............. | 360/265.6 |

FOREIGN PATENT DOCUMENTS

| | | |
|---|---|---|
| GB | 2382386 | 5/2003 |
| WO | 03/025907 | 3/2003 |

* cited by examiner

*Primary Examiner* — Julie Anne Watko  
(74) *Attorney, Agent, or Firm* — Abel Law Group, LLP; Chi Suk Kim

(57) ABSTRACT

A thin component such as the actuator arm (10) of a hard disk drive, is mounted on a pivot or pin (31), such as the pivot assembly of the hard disk drive, using a ring (32), e.g. a tolerance ring, having one or more projections (35), wherein the engagement of the component (30) and the ring (32) is such as to apply a force to the component (30) in a direction which is inclined to both the radial and axial directions of the pivot or pin (31). The pivot or pin (31) has a flange onto which the component (30) is pressed by the axial component of the force generated by the ring on the component. The edge of the ring (32) remote from the component (30) is engaged with a stop element, e.g. another flange (34) of the pivot or pin (31).

19 Claims, 5 Drawing Sheets

FIXING OF COMPONENTS

This application claims priority to PCT International Application No. PCT/GB2005/004067, filed 21 Oct. 2005, which claims priority to Application No. GB 0425856.2, filed 24 Nov. 2004.

FIELD OF THE INVENTION

The present invention relates the fixings of components to a pivot or pin, using a tolerance ring.

BACKGROUND OF THE INVENTION

It is well known to use a tolerance ring to mount a component on a pivot or pin. The component has a bore in it, into which the pivot or pin is received, and the tolerance ring is mounted in the bore, between the pivot or pin and the wall of the bore to act as a link. The tolerance ring provides sufficient rigidity in the connection, but permits the component to move relative to the pivot or pin when excessive loads are applied. Tolerance rings are used, for example, to mount the actuator arm of a hard disk drive onto the pivot assembly for that arm.

However, recent developments in such hard disk drive arrangements have tended to use actuator arms of reduced thickness, thereby reducing the amount of contact between the tolerance ring and the arm. As the thickness of the arm is reduced, so is the axial length of the bore in the arm, and hence, the engagement of the arm by the tolerance ring also reduces, possibly to a point at which the gripping of the arm by the tolerance ring becomes ineffective. In practice, if the arm has a thickness of less than 3 mm, the normal arrangements for mounting an actuator arm onto its pivot assembly via a tolerance ring made be unsuccessful.

FIG. 1 of the accompanying drawings illustrates the mounting of a conventional actuator arm for a hard disk drive. The arm 10 has a bore 11 therein into which is received a pivot assembly 12. The pivot assembly 12 is mounted on a suitable mounting (not shown) to enable to actuator arm to move relative to the hard disk(s) of the drive. In the arrangement of the FIG. 1, the arm 10 is intended for use with 3 disks, and the arm 10 divides into three heads 13 at its end, which will move proximate respective disks (not shown) of the drive.

As illustrated in FIG. 1, there is a tolerance ring 14 which is mounted on the pivot assembly 12, which will engage the walls of the bore 11. The tolerance ring 14 has ridges 15 thereon which will grip the wall of the bore 11. Because there are multiple heads 3, the bore 11 has sufficient axial length for the gripping by the tolerance ring 14 to be sufficient to hold the arm 10 in place on the pivot assembly, at least for the normal range of forces that are applied to the arm.

However, as the capacity of hard disks is reduced, there is less need for multiple heads and disks in a hard disk drive, and thus the thickness of the arm 10 may be reduced. The axial length of the bore 11 may then be insufficient provides suitable gripping by the tolerance ring 14.

It has been suggested that other arrangements may be used to fix the arm of a hard disk drive onto the pivot assembly. Thus, as illustrated in FIG. 2 the arm 10 may be held onto the pivot assembly 12 by a clip 20. Alternatively, adhesive 21 may be applied between the arm 10 and the pivot assembly 12, as in FIG. 3. However, such arrangements are not satisfactory, because the arrangement of FIG. 2 may not provide sufficient radial stiffness, and the use of adhesive as in FIG. 3 makes manufacturing more difficult.

SUMMARY OF THE INVENTION

Therefore, at its most general, the present invention proposes that a thin component, such as the actuator arm of a hard disk drive, is mounted on a pivot or pin, such as the pivot assembly of the hard disk drive, using a tolerance ring, the engagement of the component and the tolerance ring being such as to apply a force to the component which is inclined to both the radial and axial directions. Moreover, the pivot or pin. has a flange onto which the component is pressed by the axial component of the force generated by the tolerance ring on the component.

Thus, the present invention may provide a method of mounting a component on a pivot or pin, the component having a bore therein and the pivot or pin having first and second flanges thereon, the method comprising:

mounting the component on the pivot or pin such that a part of the pivot or pin and the first flange passes through the bore, the mounting being such as to cause the component to abut the second flange; and mounting a ring between the component and the first flange, the ring being a split ring with at least one projection projecting radially outward therefrom, the mounting of the ring being such that an edge of the ring remote from the component abuts the first flange and the at least one projection exerts a force on the component, which force is inclined to both the radial and axial directions of the pivot or pin.

Although the present invention has been devised for the mounting of an actuator arm on the pivot assembly of a hard disk drive, the present invention is not limited to such arrangements and applies to any arrangement in which a thin component is mounted on a pivot or pin.

Preferably, the thin component is mounted onto the pivotal pin, to abut the flange, and then the ring is slid over the pivot pin, on the side of the component remote from the flange, to engage the component and to force it onto the flange. Preferably, the pivot or pin has a further flange, which engages the edge of the ring remote from the component, when the ring is in place.

As the ring is to engage the component via the projection or projections thereon, those projections may be such as to partially deform when they engage the component. Alternatively, or in addition, the bore in the component, into which the ring is received, may be tapered.

The ring may be a tolerance ring such as those that are used in the known arrangements that were described with reference to FIG. 1. Such a ring has a plurality of projections around its circumference, which projections are regularly spaced to define a wave-like circumferential profile. The projections of the tolerance ring then engage the component in a way which generates both axial and radial forces, as previously mentioned. Modified tolerance rings may also be used, e.g. with a circumferential rib which, in use, will adjacent to the first flange and provide some axial resilience to the tolerance ring. Moreover, whilst normal tolerance rings are axially straight, at the parts other than projections, it is possible for the tolerance ring to be bowed in the axial direction, again to provide some resilience.

However, the present invention is not restricted to the use of tolerance rings. For example, a ring may be used with a single circumferential projection forming a rib around the ring, with that rib then engaging the component. The fact that the rib is bowed in the axial direction gives compressibility to the ring in the axial direction, thus providing the resilience needed. Such a ring may further be varied e.g. by provision of a plurality of projections on either side of the rib, in a manner similar to a tolerance ring.

Other ring shapes are possible, provided they engage the first flange and the component, and exert a force on the component which has both an axial and a radial component.

BRIEF DESCRIPTIONS OF THE DRAWINGS

Embodiments of the present invention will now be described in detail, by way of example, with reference to the accompanying drawings, in which.

DESCRIPTION OF THE PREFERRED EMBODIMENTS

Figure 1:
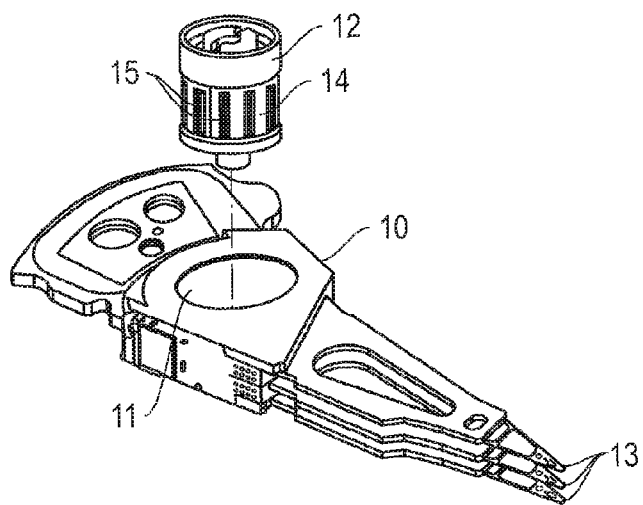
FIG. 1 shows the mounting of a conventional actuator arm on a pivot assembly of a hard disk drive, and has already been described.
Figure 2:
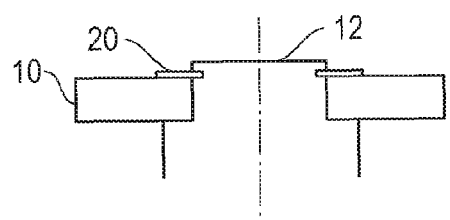
FIGS. 2 and 3 show alternative ways of mounting the actuator arm of a hard disk drive on its pivot assembly, and also have already been discussed.
Figure 3:
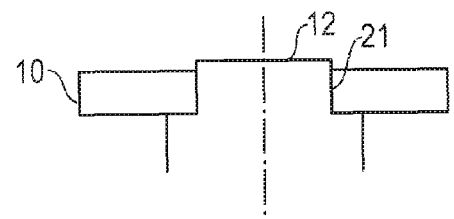
Figure 4:
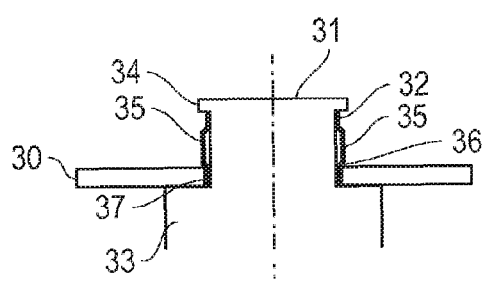
FIG. 4 shows a first embodiment of the present invention.

Referring first to FIG. 4, a thin component 30, such as an actuator arm of a hard disk drive is mounted on a pivot or pin 31, such as the pivot assembly of a hard disk drive, using a split ring being a tolerance ring 32. The pivot or pin 31 has a first flange 33 onto which the component 30 is compressed by the tolerance ring 32, and also has a further flange 34 at its end remote from the flange 33, against which abuts the axial end of the tolerance ring 32 remote from the component 30, thereby preventing the tolerance ring 32 moving upwardly in FIG. 4.

As illustrated in FIG. 4, the projections 35 of the tolerance ring 32 engage the corner 36 of the bore 37 in the component, and exert on the component 30 a force which has both axial and radial components. The axial component of that force presses the component 30 against the flange 33, and the radial component provides engagement between the tolerance ring 32 and the component 30, thereby holding the component 30 in place on the pivot or pin 31.

In FIG. 4, the tolerance ring 32 is a high wave height tolerance ring, so that the projections 35 deform at the corner 36.

Figure 5:
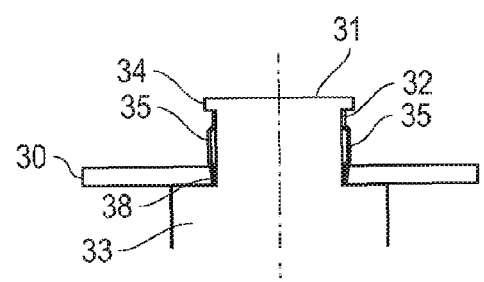
FIG. 5 shows a second embodiment of the present invention.

FIG. 5 illustrates a second embodiment, which is similar to the embodiment of FIG. 4 and the same reference numerals are used to indicate corresponding parts. However, in the embodiment of FIG. 5 the bore 38 in the component 30 is tapered so that the mouth of the bore 38 is narrower at the end at which abuts the flange 33 than it is at the end which abuts the projections 35 of the tolerance ring 32. Again, however, the tolerance ring 32 applies a force to the component 30 which force has both radial and axial components.

Figure 6A:
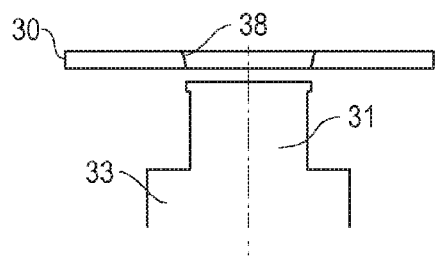
FIGS. 6a to 6e show stages in assembling the second embodiment.
Figure 6B:
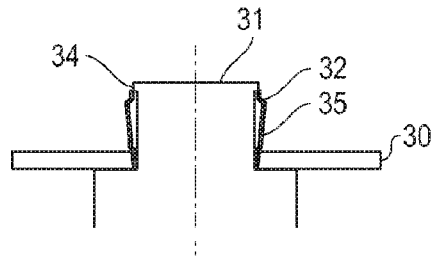

FIG. 6a to 6e illustrate stages in the assembly of the embodiment of FIG. 5. First, as illustrated in FIG. 6a, the component 30 is fitted onto the pivot or pin 31 with the upper part of the pivot or pin 31 passing through the bore 38 in the component. The component 30 is positioned so that it abuts the flange 33. Next, as shown in FIG. 6b, the tolerance ring 32 is slid axially over the upper part of the pivot or pin 31, to a position in which the projections 35 abut the component 30. As can be seen in FIG. 6b, the tolerance ring 32 must widen to pass the flange 34. That is achieved due to the conventional split (not shown) in the tolerance ring 32. Next, an assembly tool 40 is slid over the tolerance ring 32 to compress the tolerance ring axially downwards in FIG. 6b. This forces the end of the tolerance ring 32 remote from the component 30 past the flange 34, so that that end of the tolerance ring abuts the surface of the flange 34 facing the flange 33. The axial compression of the tolerance ring can occur because the diameter of the bore 41 in the assembly tool 40 is sufficiently wide to pass the flange 34, but is narrower than the overall diameter of the tolerance ring 32 including the projections 35. Thus, the tool 40 will bear against those projections 35, thereby deforming the tolerance ring axially, and permitting its end to pass the flange 34.

Figure 6C:
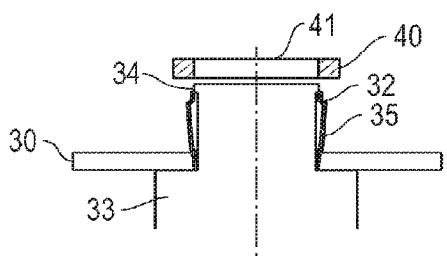
Figure 6D:
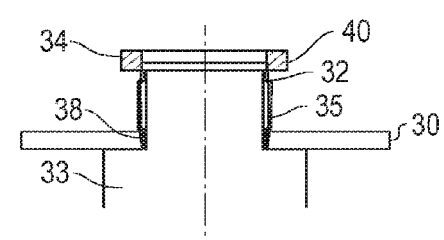
Figure 6E:
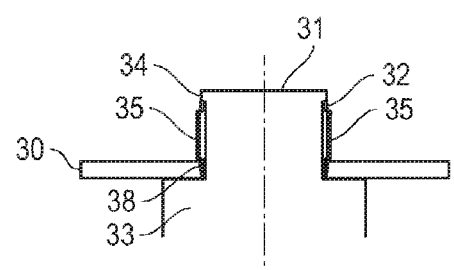

The result is shown in FIG. 6d, in which the end of the tolerance ring 32 remote from the component 30 abuts against the face of the flange 34 which replaces the flange 33. In that position, a tolerance ring 32 cannot move axially upwards in FIG. 6d. Moreover, the axial movement of the tolerance ring 32 between the position shown in FIG. 6c and that shown in FIG. 6d causes the projections 35 to be forced against the component 30, thereby exerting on that component the clamping force which has already been described, which has both radial and axial components. Finally, the tool is removed, and the structure corresponds to that of FIG. 6d, which also is the same as FIG. 5.

The assembly of the embodiment of FIG. 4 may be identical, although the movement of the tolerance ring between the position shown in FIG. 6c and that shown in FIG. 6d will then cause the deformation of the projections 35 on the corner 36 which has already been mentioned.

In the embodiments discussed above, the split ring is a tolerance ring, and may be a conventional tolerance ring. However, the present invention is not limited to the use of conventional tolerance rings, and other forms of split ring which may be used in the present invention will now be described with reference to FIGS. 7a to 7e. It should be noted, however, that the present invention is not limited to these particular ring configurations.

Figure 7A:
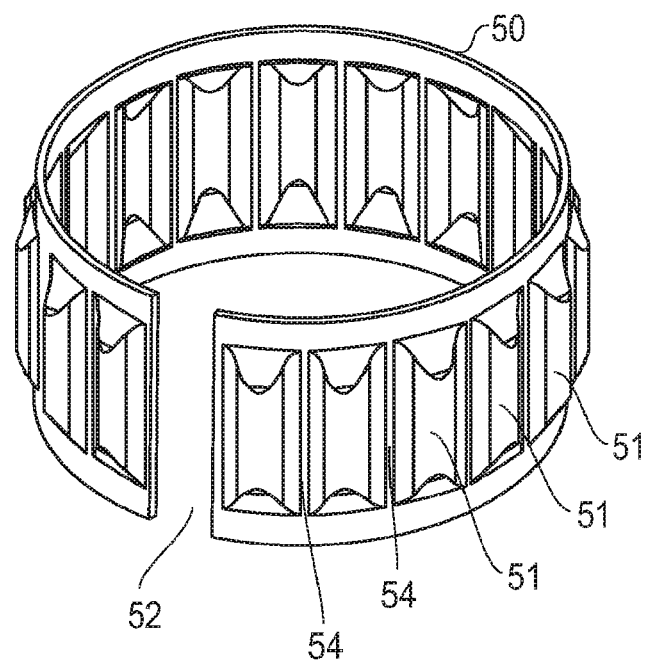
FIGS. 7a to 7e show alternative forms of ring which may be used in the embodiments of the present invention.

Thus, FIG. 7a shows a modified tolerance ring 50 with a plurality of projections 51 around it. Those projections 51 are larger than is usual in a tolerance ring, so giving the ring greater strength under axial compression, which it will experience when in the position e.g. shown in FIG. 4. Nevertheless, the projections 51 effectively form a wave-like circumferential profile the axial mid-point of the ring 50. FIG. 7a shows that the ring 50 has a split 52 therein, as is conventional for a tolerance ring.

Figure 7B:
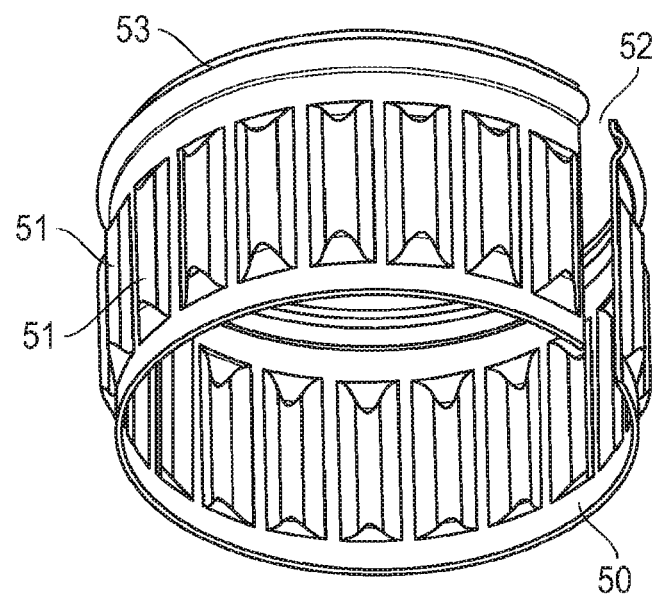
Figure 7C:
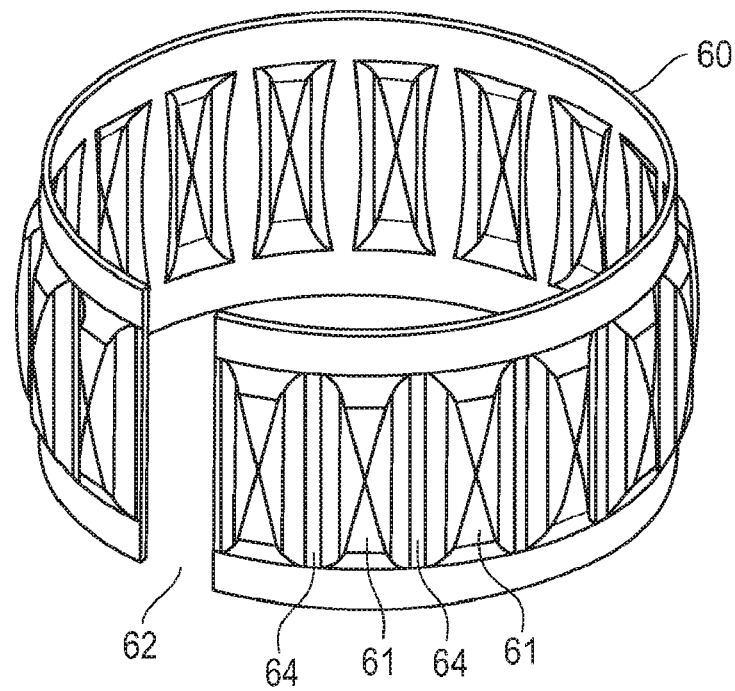
Figure 7D:
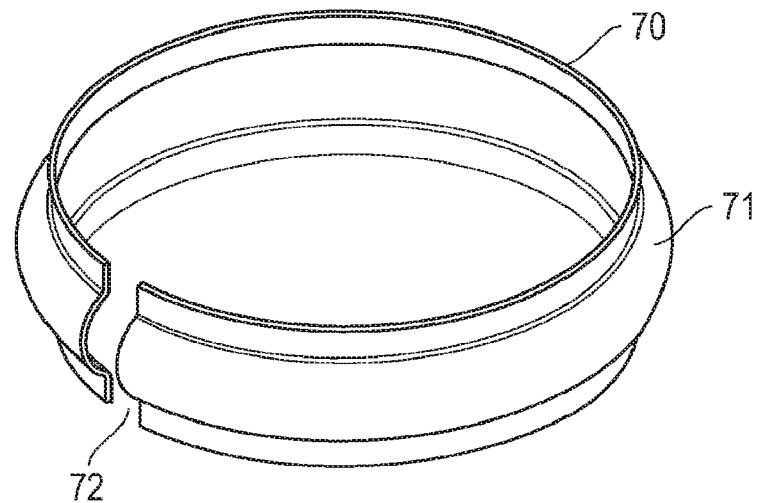

FIG. 7d shows a modification of the ring of 7a, and the same reference numerals are used to indicate corresponding parts. However, in the ring shown in FIG. 7b, there is a circumferential rib 53 adjacent one axial end of the ring 50. When the ring 50 is used in the present invention, that rib 53 will be adjacent to the flange 34 shown in FIGS. 4 or 5. The presence of that rib 53 provides some axial resilience to the ring 50, in that the rib 53 may be deformed when the ring 50 is under axial load, but that deformation will create a counter-force tending to push the projections 51 of the ring 50 onto the component 30.

Normally, a tolerance ring is, except at its projections, straight in the axial direction. Thus, in e.g. FIG. 7a, the parts 54 of the ring between the projections 51 are parallel to the axis. FIG. 7c then shows a modified tolerance ring 60 with projections 61 and a split 62 which is generally similar to the tolerance ring of FIG. 7a, except that the ring is bowed. Thus, the parts 64 between the projections 61 are not parallel to the axis of the ring 60, but are curved so that their ends are closer to the axis of the ring 60 than their mid-point. The arrangement of FIG. 7c may thus be considered a modified tolerance ring, although it is not usual for a tolerance ring to be bowed in this way.

Whilst the split ring of FIG. 7a is a tolerance ring, and the rings of FIG. 7b and 7c may be considered modified tolerance rings, the split of FIG. 7d is not a tolerance ring at all. Instead, the ring 70 has a single circumferential rib 71 which forms a projection around the ring 70. Again, the ring has a split 72 therein, but in the arrangement of FIG. 7d the rib 71 must provide both axial resilience to the ring 70 and also sufficient engagement force with component 30 when used in the arrangements of FIGS. 4 or 5. The rib 71 thus engages the component 30 in a way which generates both an axial and radial force component.

Figure 7E:
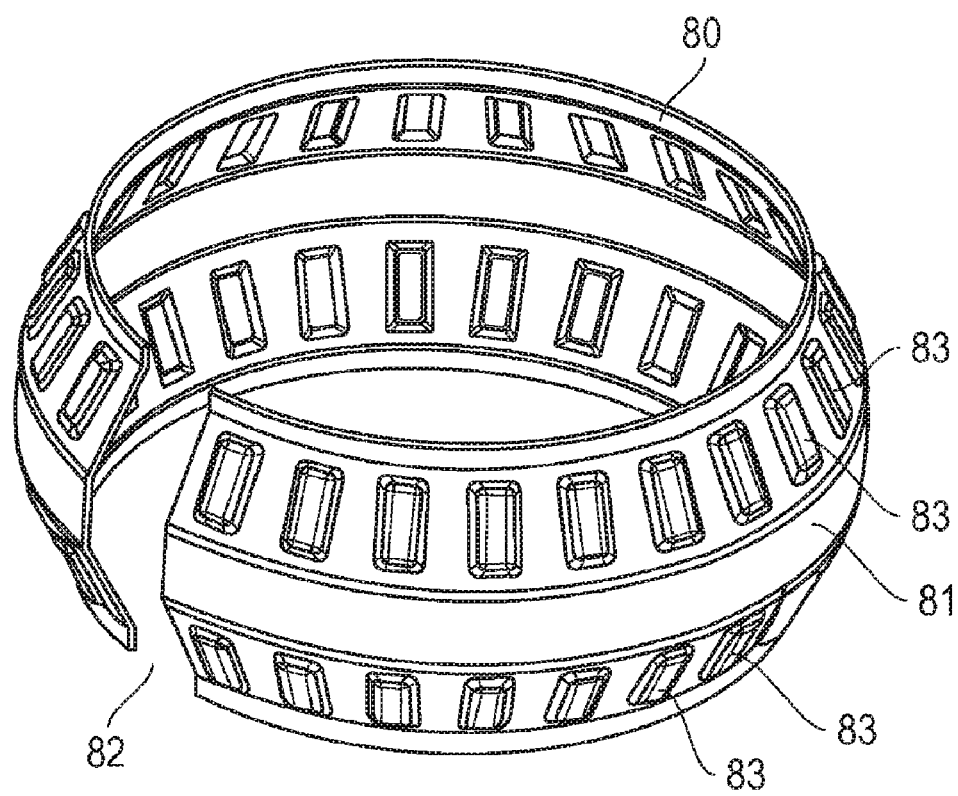

Finally, FIG. 7e shows a split ring which combines some of the features of the ring of FIG. 7d with a tolerance ring. It has a central rib 81 therein, and a split 82. However, on either side of the rib there are projections 83 in a manner similar to a tolerance ring. However, as can be seen in FIG. 7e, those projections have an outer face which is inclined to the axis of the ring 80, with the inclination of the projections 83 above and below the rib 81 being in opposite directions. With such an arrangement, the ribs 83 which are below the rib 81, when the ring 80 is mounted on the pivotal pin 31, engage the component 30 and exert both an axial and radial force component because of their inclination to the axis of the ring 80.

It can be seen that the rings of FIG. 7a, 7c, 7d and 7e may be inverted and still used in the arrangements of FIGS. 4 and 5, but the ring of FIG. 7b has a "direction" in that the rib 53 must be at the end of the ring 50 nearest the flange 34.

The invention claimed is:

1. An assembly comprising:
a component mounted on a pivot or pin, the component having a bore therein and the pivot or pin having a first flange thereon, wherein the component abuts the first flange, and a part of the pivot or pin projects through the bore,
a ring mounted on the pivot or pin, the ring being a split ring with one or more projections projecting radially outward therefrom, an edge of the ring remote from the component abutting a stop element, and the at least one projection exerting a force on the component, which force is inclined to both the radial and axial directions of the pivot or pin; and
the component is an actuator arm and the pivot or pin is part of a pivot assembly of the hard disk drive.

2. The assembly according to claim 1, wherein the stop element is a second flange of the pivot or pin.

3. The assembly according to claim 1, wherein the bore is tapered such that its opening nearest to and abutting the first flange is smaller than its opening nearest the stop element.

4. The assembly according to claim 1, wherein the tolerance ring has a circumferential rib.

5. The assembly according to claim 4, wherein the circumferential rib is adjacent one axial end of the ring.

6. The assembly according to claim 5, wherein the circumferential rib is axially spaced apart from the one or more projections.

7. The assembly according to claim 4, wherein the circumferential rib is the only projection.

8. The assembly according to claim 4, wherein the circumferential rib is located axially between at least two of the one or more projections.

9. The assembly according to claim 8, wherein the one or more projections have outer faces that are inclined to an axis of the ring, with the inclination of the outer faces above and below the circumferential rib being in opposite directions.

10. The assembly according to claim 1, wherein the ring is bowed, such that the one or more projections are not parallel to an axis of the ring, but are curved so that axial ends of the one or more projections are closer to the axis than mid-points of the one or more projections.

11. A hard disk drive, comprising:
an enclosure having a pivot extending therefrom, the pivot having a first flange and a second flange that is axially spaced apart from the first flange;
an actuator having an axis and a bore along the axis, and the actuator is mounted to the pivot and abuts the first flange to restrain axial motion of the actuator toward the first flange; and
a tolerance ring mounted on the pivot and having one or more projections projecting radially outward therefrom into contact with the actuator in both the axial and radial directions to restrain the actuator in both the axial and radial directions, the tolerance ring also having an axial end opposite the actuator that abuts the second flange.

12. A hard disk drive according to claim 11, wherein the bore is tapered such that a first axial end of the bore nearest to and abutting the first flange is smaller than a second axial end nearest to the second flange, and the tapered bore forms a surface with both axial and radial components, and the one or more projections directly engage the tapered bore.

13. A hard disk drive according to claim 11, wherein the one or more projections abut both the bore and a surface of the actuator that is perpendicular to the axis.

14. A hard disk drive according to claim 11, wherein the tolerance ring has a circumferential rib.

15. A hard disk drive according to claim 14, wherein the circumferential rib is adjacent one axial end of the tolerance ring.

16. A hard disk drive according to claim 14, wherein the circumferential rib is axially spaced apart from the one or more projections.

17. A hard disk drive according to claim 14, wherein the circumferential rib is the only projection.

18. A hard disk drive according to claim 14, wherein the circumferential rib is located axially between at least two of the one or more projections, and the one or more projections have outer faces that are inclined relative to the axis, with the inclination of the outer faces above and below the circumferential rib being in opposite directions.

19. A hard disk drive according to claim 11, wherein the tolerance ring is bowed, such that the one or more projections are not parallel to the axis, but are curved so that axial ends of the one or more projections are closer to the axis than mid-points of the one or more projections.

* * * * *